United States Patent [19]

Iwai et al.

[11] Patent Number: 4,619,591
[45] Date of Patent: Oct. 28, 1986

[54] IN-TANK TYPE FUEL PUMP

[75] Inventors: Shingo Iwai; Ryozo Suzuki; Jun Shiraga; Tetsuo Okashiro, all of Fukuyama, Japan

[73] Assignee: Mitsubishi Denki Kabushiki Kaisha, Tokyo, Japan

[21] Appl. No.: 795,403

[22] Filed: Nov. 6, 1985

[51] Int. Cl.⁴ .................. F04B 17/00; H02K 5/02; H02K 5/04
[52] U.S. Cl. ............................... 417/422; 310/71; 310/89
[58] Field of Search ............... 417/422; 310/89, 71

[56] References Cited

U.S. PATENT DOCUMENTS

| | | | |
|---|---|---|---|
| 2,911,918 | 11/1959 | Reed | 417/422 X |
| 3,150,278 | 9/1964 | Clark | 310/89 |
| 3,308,316 | 3/1967 | Pfahl | 310/71 |
| 3,555,319 | 1/1971 | Schaefer | 310/71 X |

FOREIGN PATENT DOCUMENTS 46-26443 7/1971 Japan .

Primary Examiner—Richard E. Gluck
Attorney, Agent, or Firm—Oblon, Fisher, Spivak, McClelland & Maier

[57] ABSTRACT

An in-tank type fuel pump comprises a pump body having a cylindrical yoke with its one end closed by a cover-out member made of a synthetic resinous material, a motor held in the pump body and an impeller driven by the motor to discharge fuel sucked from an intake port to a discharge port, wherein an elongated portion extending along the inner wall of the cylindrical yoke is formed integrally with the cover-out member and each of first lead wires is extended from the interior of the pump body to the exterior of the same through each through hole formed in the elongated portion, each one end of the first lead wires in the pump body being connected to each of second lead wires connected to brushes.

8 Claims, 5 Drawing Figures

IN-TANK TYPE FUEL PUMP

The present invention relates to an in-tank type fuel pump used for automobiles.

A conventional fuel pump of this kind will be described with reference to FIG. 1.

A pump body 1 is constituted by a cylindrical yoke 2, a housing base 3, a housing cover 4 and a cover-out member 5. Magnetic poles 6 are fixed to the inside of the pump body 1; bearing metals 7, 8 are respectively secured to the cover-out member 5 and the housing base 3 to support an armature shaft 9 on which an armature iron core 11 is mounted. A commutator 12, brushes 13 held by brush holders 14 and brush springs 15 constitute a motor assembly M together with the armature 10 and the commutator 12. An intake port 16 is formed in the housing cover 4 and a discharge port 17 is formed in the cover-out member 5. An impeller 18 is placed in a housing 19 formed between the housing base 3 and the housing cover 4 and is engaged with bosses 106 and 107 formed at one end portion of the commutator 12. One end of each conductive lead wire 21 is connected to each of the brush 13 and the other end of it is connected to each terminal piece 22.

The operation of the conventional fuel pump will be described.

When a power from a power source is supplied to the brushes 13 through the conductive lead wires 21, the armature shaft 9 is rotated, namely, the commutator 12 is rotated, whereby the impeller 18 connected to the commutator 12 by means of the bosses 106, 107 is rotated. Then, fuel stored in a fuel tank is sucked in the housing 19 through the intake port 16 owing to the rotation of the impeller 18. The fuel in the housing 19 is pressurized by the impeller 18 to be supplied to the side of a carburetor (not shown) through the discharge port 17.

In the conventional fuel pump, there is employed such construction to draw out the conductive lead wires 21 that the outer terminal pieces 22 electrically connected to the conductive lead wires 21 are drawn out from the cylindrical yoke 2 in its radial direction, or the terminal pieces 22 are extented along the inner wall of the cylindrical yoke 2 to be drawn in the axial direction from one end of the of the yoke 2.

In the former case, however, the terminal pieces 22 drawn out from the cylindrical yoke 2 constitute an obstacle to an elastic casing (not shown) which surrounds the pump body 1, this necessitating an additional structure for drawing out the terminal pieces 22 from the elastic casing. On the other hand, the later case has a disadvantage that the terminal pieces 22 may come in contact with the armature 10. To avoid such disadvantages, there is a proposal that a hole for insertion of the terminal pieces is formed in the circumferential wall of the cylindrical yoke. However, in this case, it is difficult to form the yoke 2 provided with the insertion hole and there may invite reduction in mechanical strength.

It is an object of the present invention to provide a in-tank type fuel pump which prevents short-circuitting and provides a simple construction to facilitate manufacturing of it.

The foregoing and the other objects of the present invention have been attained by providing an in-tank type fuel pump comprising a pump body having a cylindrical yoke with its one end closed by a cover-out member made of a synthetic resinous material, a motor held in the pump body and an impeller driven by the motor to discharge fuel sucked from an intake port to a discharge port, characterized in that an elongated portion extending along the inner wall of the cylindrical yoke is formed integrally with the cover-out member and each of first lead wires is extended from the interior of the pump body to the exterior of the same through each through hole formed in the elongated portion, each one end of the first lead wires in the pump body being connected to each of a socond lead wires connected to brushes.

In drawing.

Figure 2:
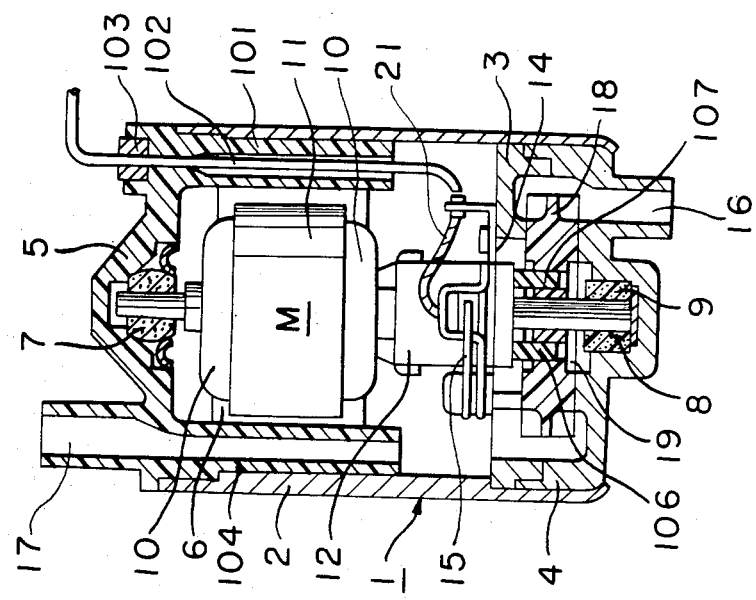
FIG. 2 is a longitudinal cross-sectional view of an embodiment of the in-tank type fuel pump of the present invention.
Figure 3:
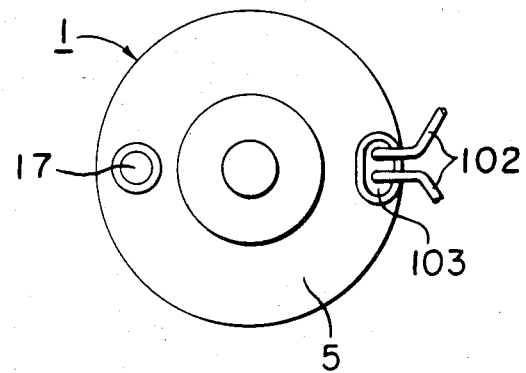
FIG. 3 is a plan view of the fuel tank shown in FIG. 2.

An embodiment of the present invention will be described with reference to FIGS. 2 and 3, in which the same reference numerals designate the same parts and therefore, description of the these parts is omitted.

Figure 1:
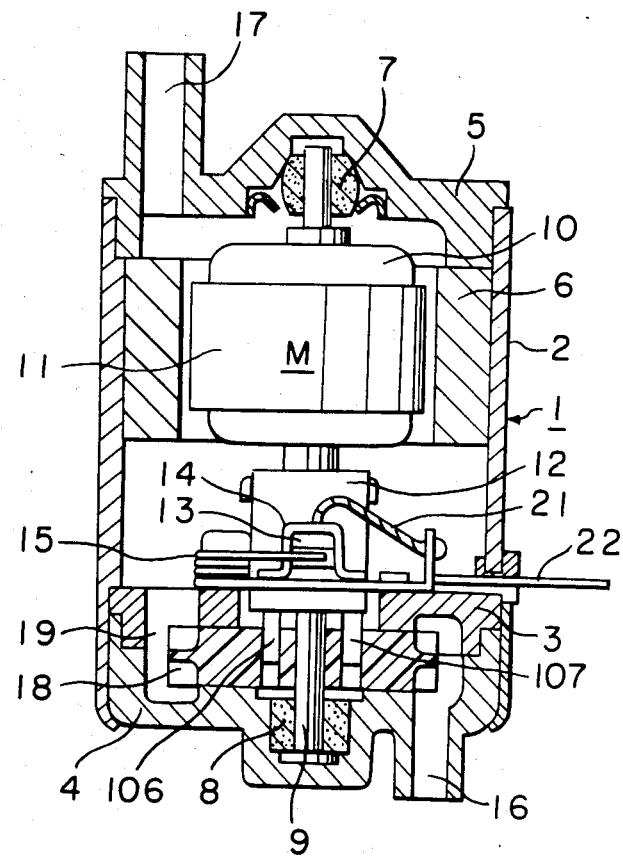
FIG. 1 is a longitudinal cross-sectional view of a conventional in-tank type fuel pump.
Figure 4:
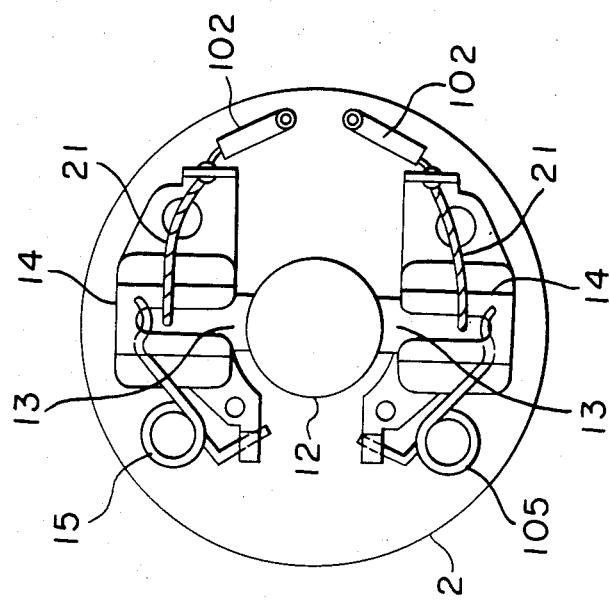
FIG. 4 is a front view showing how lead wires are connected to brushes in the in-tank type fuel pump of the present invention.
Figure 5:
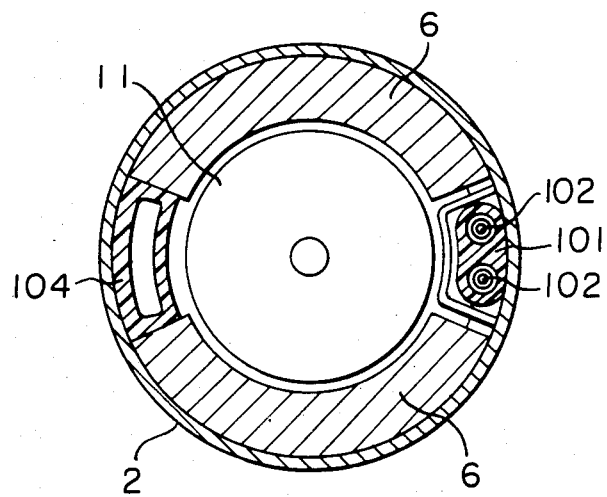
FIG. 5 is a cross-sectional view of the present invention.

An elongated portion 101 is formed integrally with a cover-out member 5 made of a synthetic resinous material and extends downwardly along the inner wall surface of a cylindrical yoke 2. The outer surface of the elongated portion is in close-contact with the inner wall surface of the yoke 2. A pair of lead wires 102 for feeding a current from the outside are extended through through holes formed in the elongated portion 101, the holes extending along the axial line of the pump body. Each one end of the lead wires 102 is electrically connected to each of lead wires 21 for feeding current to the brushes through brush holders 14 (FIG. 4). Each other end of the lead wires 102 is led outside of the pump body through each through hole formed in the elongated portion 101 (FIG. 5). A bushing 103 is provided at an opening of the cover-out member 5 so that breakage of the lead wires 102 caused by bending the lead wires can be prevented. Another elongated portion 104 provided with a through hole is formed diametrically opposing the elongated portion 101 and extends along the inner wall surface of the cylindrical yoke 2 so as to be in close-contact with the inner surface of the yoke 2. The upper part of the through hole of the elongated portion 104 is communicated with a discharge port 17 formed in the cover-out member 5.

Sucking and discharging operations for fuel provided by the revolution of an impeller 18 are same as those of the conventional fuel pump.

In the fuel pump of the present invention, since the lead wires 102 are led to the exterior of the pump body through the elongated portion 101, the lead wires 102 do not constitute an obstacle for a casing surrounding the pump body 1, and breakage of the lead wires 102 caused by contact with the armature 10 or so on which may result short-circuiting is eliminated. Particularly, since the elongated portion 101 is formed integrally with the cover-out member, operations for forming the cylindrical yoke 2 is easier than the way of forming a insertion holes for the lead wires in the circumferential wall of the cylindrial yoke 2 and sufficient mechanical strength is assured for the circumferential wall of the yoke 2.

It is not always possible to bring the outer surface of the elongated portion 101 to be in close-contact with the inner wall surface of the cylindrical yoke 2. However, when the elongated portion 101 is brought into a close-contact state, the elongated portion 101 acts as a position-determining member for the cover-out member 5 whereby looseness of the cover-out member can be prevented. Further, the cover-out member 5 can be stably fitted to the pump body when the elongated portion 104 formed in the cover-out member 5 to be communicated with the discharge port is in contact with the inner wall surface, in addition to a frictional force of the elongated portion 101 to the inner wall of the yoke 2.

The lead wire 102 is not limitted to the construction as in the above-mentioned embodiment, but it is possible to use an elongated terminal piece.

As described above, an elongated portion is formed integrally with the cover-out member, and conductive lead wires are led out through the cylindrical through holes formed in the elongated portion, whereby occurrence of short-circuitting and breakage of the wires are prevented.

We claim:

1. In-tank type fuel pump comprising a pump body having a cylindrical yoke with its one end closed by a cover-out member made of a synthetic resinous material, a motor held in said pump body and an impeller driven by said motor to discharge fuel sucked from an intake port to a discharge port, characterized in that an elongated portion extending along the inner wall of said cylindrical yoke is formed integrally with said cover-out member and each of first lead wires is extended from the interior of said pump body to the exterior of the same through each through hole formed in said elongated portion, each one end of said first lead wires in said pump body being connected to each of second lead wires connected to brushes.

2. An in-tank type fuel pump according to claim 1, wherein said elongated portion is in close-contact with the inner wall of said cylindrical yoke.

3. An in-tank type fuel pump according to claim 1, whrerein number of said through holes formed in said elongated portion corresponds to number of said first lead wires to be passed in said through holes.

4. An in-tank type fuel pump according to claim 1, wherein said through holes formed in said elongated portion extend parallel to the axial line of said pump body.

5. An in-tank type fuel pump according to claim 1, wherein the outer surface of said elongated portion is in close-contact with the inner wall surface of said cylindrical yoke.

6. An in-tank type fuel pump according to claim 1, wherein a second elongated portion is formed integrally with the said cover-out member diametrically opposing said elongated portion.

7. An in-tank type fuel pump according to claim 6, wherein the outer surface of said second elongated portion is in close-contact with the inner wall of said cylindrical yoke.

8. An in-tank type fuel pump according to claim 6, wherein a through hole is formed in said second elongated portion to communicated with said discharge port formed in said cover-out member.

* * * * *